(12) United States Patent
Deardorff et al.

(10) Patent No.: US 11,711,383 B2
(45) Date of Patent: *Jul. 25, 2023

(54) AUTONOMOUS GENERATION OF ATTACK SIGNATURES TO DETECT MALICIOUS NETWORK ACTIVITY

(71) Applicant: Rapid7, Inc., Boston, MA (US)

(72) Inventors: Paul Deardorff, Durham, NC (US); Dustin Myers, Alexandria, VA (US)

(73) Assignee: Rapid7, Inc., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/384,431

(22) Filed: Jul. 23, 2021

(65) Prior Publication Data

US 2021/0352092 A1 Nov. 11, 2021

Related U.S. Application Data

(63) Continuation of application No. 16/398,503, filed on Apr. 30, 2019, now Pat. No. 11,108,790.

(51) Int. Cl.
*H04L 9/40* (2022.01)
*G06F 21/53* (2013.01)
*G06F 9/451* (2018.01)
*H04L 43/08* (2022.01)

(52) U.S. Cl.
CPC ......... *H04L 63/1416* (2013.01); *G06F 9/451* (2018.02); *G06F 21/53* (2013.01); *H04L 43/08* (2013.01); *H04L 63/1425* (2013.01); *G06F 2221/033* (2013.01)

(58) Field of Classification Search
CPC . H04L 63/1416; H04L 43/08; H04L 63/1425; H04L 41/142; H04L 41/145; G06F 9/451; G06F 21/53; G06F 2221/033; G06F 2221/034; G06F 21/577
See application file for complete search history.

(56) References Cited

U.S. PATENT DOCUMENTS

| | | | |
|---|---|---|---|
| 2016/0149667 A1 | 5/2016 | Ranatunga | |
| 2016/0149937 A1 | 5/2016 | Katmor et al. | |
| 2016/0149967 A1* | 5/2016 | Lewis | A63F 13/87 715/753 |
| 2016/0212159 A1* | 7/2016 | Gupta | G06F 21/54 |
| 2016/0359875 A1* | 12/2016 | Kim | G06F 21/566 |
| 2017/0351859 A1* | 12/2017 | Antonov | G06F 21/566 |
| 2019/0294788 A1* | 9/2019 | Chang | G06F 21/554 |
| 2019/0327263 A1* | 10/2019 | Jalio | G06F 21/567 |

* cited by examiner

*Primary Examiner* — Abiy Getachew
(74) *Attorney, Agent, or Firm* — Ashwin Anand

(57) ABSTRACT

Methods and systems for detecting malicious activity on a network. The methods described herein involve gathering data regarding a first state of a computing environment, executing an attack tool to simulate malicious activity in the computing environment, and then gathering data regarding a second state of the computing environment. The methods described herein may then involve generating a signature based on changes between the first and second states, and then using the generated signature to detect malicious activity in a target network.

20 Claims, 7 Drawing Sheets

AUTONOMOUS GENERATION OF ATTACK SIGNATURES TO DETECT MALICIOUS NETWORK ACTIVITY

TECHNICAL FIELD

This application is a continuation of U.S. patent application Ser. No. 16/398,503, filed Apr. 30, 2019, which is hereby incorporated by reference herein in its entirety.

Embodiments described herein generally relate to systems and methods for monitoring network activity and, more particularly but not exclusively, to systems and methods for detecting malicious activity on a network.

BACKGROUND

Due to their prevalence in today's society, the internet and other types of networks have become a hub for criminal activity. Often times cyber-criminals or other threat actors attempt to install or otherwise deploy harmful applications on unprotected systems. Once a threat actor obtains access to a targeted system or device, they may perform further actions such as stealing data, escalating their privileges, or the like.

Certain network activity may indicate that a malicious actor has obtained access to or has otherwise infiltrated a network or a device thereon. Existing techniques for detecting these intrusions rely on manually-generated attack signatures based on known compromises.

Security targets often purchase a feed or feeds of signatures from an external data provider to facilitate the identification of attacks on their networks. In many cases, these companies may rely on a product vendor to provide these signatures. The effectiveness of these tools depends on the quality of signatures supplied by the vendor. Creating these signatures, however, is a time consuming and laborious process.

A need exists, therefore, for systems and methods for detecting malicious activity that overcome the disadvantages of existing techniques.

SUMMARY

This summary is provided to introduce a selection of concepts in a simplified form that are further described below in the Detailed Description section. This summary is not intended to identify or exclude key features or essential features of the claimed subject matter, nor is it intended to be used as an aid in determining the scope of the claimed subject matter.

In one aspect, embodiments relate to a method for detecting malicious activity on a network. The method includes gathering data regarding a first state of a computing environment, executing at least one attack tool in the computing environment to simulate malicious activity, gathering data regarding a second state of the computing environment after the at least one attack tool is executed, detecting at least one trace of the malicious activity from the data regarding the second state of the computing environment, and autonomously generating at least one signature for detecting future malicious activity, wherein the at least one generated signature is based on the at least one detected trace.

In some embodiments, the computing environment is a sandbox environment.

In some embodiments, detecting the at least one trace comprises comparing the data regarding the second state of the computing environment to the data regarding the first state of the computing environment to detect at least one difference between the first state of the computing environment and the second state of the computing environment, the at least one difference being the at least one trace of the malicious activity.

In some embodiments, the method further includes monitoring future network activity to detect activity matching the at least one generated signature, wherein activity matching the at least one generated signature indicates malicious activity. In some embodiments, the method further includes issuing an alert using a user interface upon detecting activity matching the at least one generated signature.

In some embodiments, the signature is defined by at least one signature parameter, and the method further includes receiving a recommendation to adjust at least one signature parameter to adjust the number of generated alerts regarding detected malicious activity.

In some embodiments, the attack tool is defined by at least one attack parameter, and the method further includes autonomously adjusting the at least one attack parameter to generate a variance in the at least one trace of malicious activity and in the at least one generated signature.

In some embodiments, the at least one trace includes at least one of a modified registry key, a modified file system access permission, a modified write access permission, a modified process, a modified file, and a dropped file.

In some embodiments, the method further includes validating the generated signature against a historical dataset of signatures to determine whether the generated signature is associated with an anomalous amount of malicious activity compared to the historical dataset.

According to another aspect, embodiments relate to a system for detecting malicious activity on a network. The system includes at least one attack tool configured to simulate malicious activity, and a virtual security appliance configured to execute instructions stored on memory to gather data regarding a first state of a computing environment before the attack tool simulates the malicious activity, gather data regarding a second state of the computing environment after the attack tool simulates the malicious activity, detect at least one trace of the malicious activity from the data regarding the second state of the computing environment, and autonomously generate at least one signature for detecting future malicious activity, wherein the at least one generated signature is based on the at least one detected trace.

In some embodiments, the computing environment is a sandbox environment.

In some embodiments, the virtual security appliance detects the at least one trace by comparing the data regarding the second state of the computing environment to the data regarding the first state of the computing environment to detect at least one difference between the first state of the computing environment and the second state of the computing environment, the at least one difference being the at least one trace of the malicious activity.

In some embodiments, the virtual security appliance is further configured to monitor future network activity to detect activity matching the at least one generated signature, wherein activity matching the at least one generated signature indicates malicious activity. In some embodiments, the system further includes a user interface configured to issue an alert upon the virtual security appliance matching the at least one generated signature.

In some embodiments, the signature is defined by at least one signature parameter, and the virtual security appliance is configured to receive a recommendation to adjust at least one signature parameter to adjust the number of generated alerts regarding detected malicious activity.

In some embodiments, the attack tool is defined by at least one attack parameter, and the virtual security appliance is further configured to autonomously adjust the at least one attack parameter to generate a variance in the at least one trace of malicious activity and in the at least one generated signature.

In some embodiments, the at least one trace includes at least one of a modified registry key, a modified file system access permission, a modified write access permission, a modified process, a modified file, and a dropped file.

In some embodiments, the virtual security appliance is further configured to validate the generated signature against a historical dataset of signatures to determine whether the generated signature is associated with an anomalous amount of malicious activity compared to the historical dataset.

According to yet another aspect, embodiments relate to a non-transitory computer readable medium containing computer-executable instructions for performing a method for detecting malicious activity on a network. The computer readable medium includes computer-executable instructions for gathering data regarding a first state of a computing environment, computer-executable instructions for executing at least one attack tool in the computing environment to simulate malicious activity, computer-executable instructions for gathering data regarding a second state of the computing environment after the at least one attack tool is executed, computer-executable instructions for detecting at least one trace of the malicious activity from the data regarding the second state of the computing environment, and computer-executable instructions for autonomously generating at least one signature for detecting future malicious activity, wherein the at least one generated signature is based on the at least one detected trace.

BRIEF DESCRIPTION OF DRAWINGS

Non-limiting and non-exhaustive embodiments of this disclosure are described with reference to the following figures, wherein like reference numerals refer to like parts throughout the various views unless otherwise specified.

DETAILED DESCRIPTION

Figure 1:
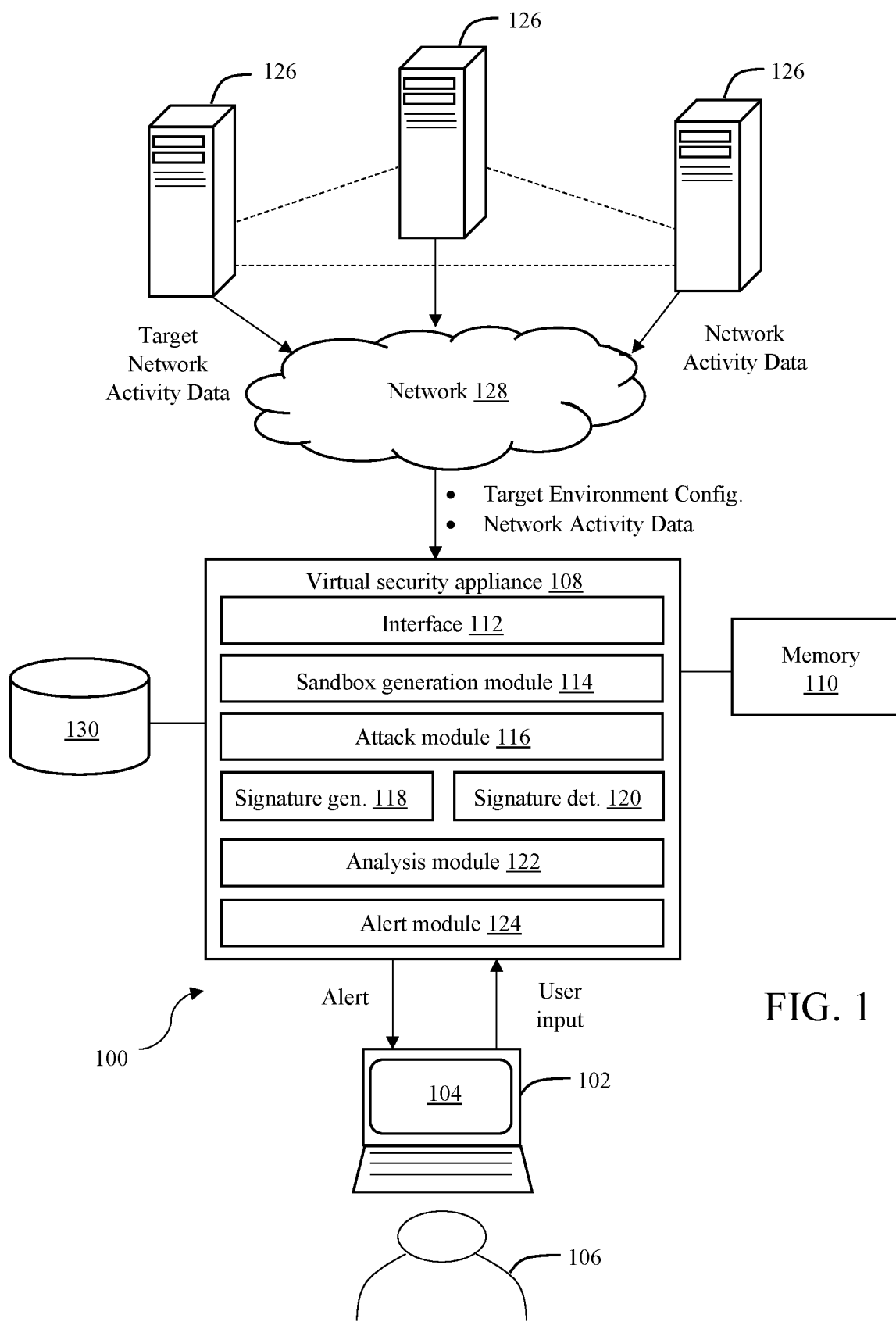
FIG. 1 illustrates a system for detecting malicious activity on a network in accordance with one embodiment.

Various embodiments are described more fully below with reference to the accompanying drawings, which form a part hereof, and which show specific exemplary embodiments. However, the concepts of the present disclosure may be implemented in many different forms and should not be construed as limited to the embodiments set forth herein; rather, these embodiments are provided as part of a thorough and complete disclosure, to fully convey the scope of the concepts, techniques and implementations of the present disclosure to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Reference in the specification to "one embodiment" or to "an embodiment" means that a particular feature, structure, or characteristic described in connection with the embodiments is included in at least one example implementation or technique in accordance with the present disclosure. The appearances of the phrase "in one embodiment" in various places in the specification are not necessarily all referring to the same embodiment. The appearances of the phrase "in some embodiments" in various places in the specification are not necessarily all referring to the same embodiments.

Some portions of the description that follow are presented in terms of symbolic representations of operations on non-transient signals stored within a computer memory. These descriptions and representations are used by those skilled in the data processing arts to most effectively convey the substance of their work to others skilled in the art. Such operations typically require physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices. Portions of the present disclosure include processes and instructions that may be embodied in software, firmware or hardware, and when embodied in software, may be downloaded to reside on and be operated from different platforms used by a variety of operating systems.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each may be coupled to a computer system bus. Furthermore, the computers referred to in the specification may include a single processor or may be architectures employing multiple processor designs for increased computing capability.

The processes and displays presented herein are not inherently related to any particular computer or other apparatus. Various general-purpose systems may also be used with programs in accordance with the teachings herein, or it may prove convenient to construct more specialized apparatus to perform one or more method steps. The structure for a variety of these systems is discussed in the description below. In addition, any particular programming language that is sufficient for achieving the techniques and implementations of the present disclosure may be used. A variety of programming languages may be used to implement the present disclosure as discussed herein.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

The systems and methods described herein provide novel techniques for generating signatures for detecting malicious activity on a network. Specifically, the systems and methods described herein provide an automated process involving capturing traces of malicious activity, generating signatures based on the captured traces, and using the generated signatures to detect malicious activity.

In accordance with various embodiments, the systems and methods herein may first create a pseudo computing environment (for simplicity "computing environment") of virtual appliances to mimic a target network. For example, an entity such as a company, agency, educational institution, or government body may want to know how malicious activity may affect their network(s). Accordingly, these entities may create (or hire some other party to create) a computing environment that mimics their network.

Creating the computing environment may involve, for example, creating a number of virtual hosts that act as actual hosts, virtual router(s), virtual switch(es), a network traffic capturing device (e.g., a dnscap tool), etc. The exact configuration of the generated computing environment, which essentially serves as a sandbox environment, may vary and may depend on the configuration of the target network.

The systems and methods described herein may note the initial state of the generated computing environment and then execute one or more attack tools to simulate malicious activity therein. The systems and methods described herein may then gather one or more snapshots of the computing environment during or after execution of the attack tool(s). Attack tools, when executed, leave behind certain artifacts or traces (for simplicity, "traces") that indicate malicious activity has occurred. Based on the state of the computing environment at this point (i.e., once the attack tool has been executed), the systems and methods described herein may detect one or more traces of the simulated malicious activity based on what has changed from the "pre-attack" state to the "post-attack" state of the computing environment.

It can be inferred that certain detected changes (i.e., traces) are indicative of malicious activity. These traces may be based on hashes (e.g., an MD5 hash) or any other indicia indicating that the computing environment has changed. The detected trace(s) can then be used to generate one or more signatures, which essentially represent a summary of the detected trace(s).

It is noted that operating systems and components thereof may be constantly changing, even if malicious activity is not occurring. Accordingly, the systems and methods described herein may configure the computing environment to minimize the amount of benign or otherwise "background noise" occuring that is unrelated to malicious activity.

In some embodiments, the systems and methods described herein may apply contextual logic to determine whether activity is the result of malicious activity or non-malicious activity. For example, if a user is interested in analyzing a particular service, the user may configure the computing environment, the attack tools, etc., to focus only on traces or changes related to that service.

As another example, a user may only be interested in how an exploit affects a database. Accordingly, the analysis may involve only inspecting folders that would be affected by the changes to the database.

In some embodiments, the systems and methods may run the same exploit multiple times and detect what changes with each iteration. While there may be a variety of different changes that occur over multiple iterations, there may be certain changes that always occur. For example, if a certain file is always created with each iteration, the file creation may constitute a trace.

The generated signature(s) may subsequently be used to detect malicious activity on a target network. When activity matching at least a portion of a signature is detected in the target network, it can be inferred that the target network has been the victim of malicious activity. An alert to that effect may be communicated to security personnel. Additionally or alternatively, one or more remedial actions may be implemented to address the malicious activity.

FIG. 1 illustrates a system 100 for detecting malicious activity on a network in accordance with one embodiment. The system 100 includes a user device 102 executing a user interface 104 for presentation to one or more users 106 such as security personnel or other users interested in detecting malicious activity on a network.

The user device 102 may be any hardware device capable of executing the user interface 104. The user device 102 may be configured as a laptop, PC, tablet, mobile device, or the like. The exact configuration of the user device 102 may vary as long as it can execute and present the user interface 104 to the user 106. The user interface 104 may allow the user 106 to input parameters regarding a computing environment to be generated and also present data regarding traces, signatures, and detected malicious activity.

The user device 102 may be in operable communication with one or more virtual security appliances 108. The virtual security appliances 108 may be any hardware device capable of executing instructions stored on memory 110 to accomplish the objectives of the various embodiments described herein. The virtual security appliances 108 may be implemented as software executing on a microprocessor, a field programmable gate array (FPGA), an application-specific integrated circuit (ASIC), or other similar device whether available now or invented hereafter.

In some embodiments, such as those relying on one or more ASICs, the functionality described as being provided in part via software may instead be configured into the design of the ASICs and, as such, the associated software may be omitted. The virtual security appliances(s) 108 may be configured as part of the user device 102 on which the user interface 104 executes, such as a laptop, or may be located on a different computing device, perhaps at some remote location.

The virtual security appliance 108 may execute instructions stored on memory 110 to provide various modules to accomplish the objectives of the various embodiments described herein. Specifically, the virtual security appliance 108 may execute or otherwise include an interface 112, a sandbox generation module 114, an attack module 116, a signature generation module 118, a signature detection module 120, an analysis module 122, and an alert module 124.

The memory 110 may be L1, L2, or L3 cache or RAM memory configurations. The memory 110 may include non-volatile memory such as flash memory, EPROM, EEPROM, ROM, and PROM, or volatile memory such as static or dynamic RAM, as discussed above. The exact configuration/type of memory 110 may of course vary as long as instructions for detecting malicious activity can be executed by the virtual security appliance 108 to accomplish the objectives of various embodiments described herein.

The interface 112 may be in communication with one or more devices 126 over one or more network(s) 128. The interface 112 may be in operable communication with one or more of these devices 126 to receive: (1) configuration instructions regarding a target network and how to generate a computing environment; and/or (2) data regarding activity on the network(s) 128 for detecting malicious activity thereon. The virtual security appliance 108 may execute instructions stored in memory 110 and rely on data stored in database(s) 130 such as previously generated signatures to monitor the received network activity data.

The network(s) 128 may link the various devices with various types of network connections. The network(s) 128 may be comprised of, or may interface to, any one or more of the Internet, an intranet, a Personal Area Network (PAN), a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1, or E3 line, a Digital Data Service (DDS) connection, a Digital Subscriber Line (DSL) connection, an Ethernet connection, an Integrated Services Digital Network (ISDN) line, a dial-up port such as a V.90, a V.34, or a V.34b is analog modem connection, a cable modem, an Asynchronous Transfer Mode (ATM) connection, a Fiber Distributed Data Interface (FDDI) connection, a Copper Distributed Data Interface (CDDI) connection, or an optical/DWDM network.

The network(s) 128 may also comprise, include, or interface to any one or more of a Wireless Application Protocol (WAP) link, a Wi-Fi link, a microwave link, a General Packet Radio Service (GPRS) link, a Global System for Mobile Communication G(SM) link, a Code Division Multiple Access (CDMA) link, or a Time Division Multiple access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based link.

In operation, the interface 112 may receive configuration data regarding a target environment. For example, a company, educational institution, government agency, or other type of entity may provide the virtual security appliance 108 with data regarding their network environment(s). This data may include, for example, and without limitation, the number and configuration of host devices, routers, switches, firewalls, servers, security appliances, traffic monitoring appliances, or the like. The configuration data may also include credentials, security authorizations, file read access permissions, file write access permissions, or the like.

As discussed previously, the user 106 may specify the generation of a computing environment that mimics a target network as much as possible. The systems and methods of the present application operate under the assumption that the effect of any simulated malicious activity in a computing environment that mimics a target network will be similar to the effect of any similar malicious activity in the target network.

Figure 2:
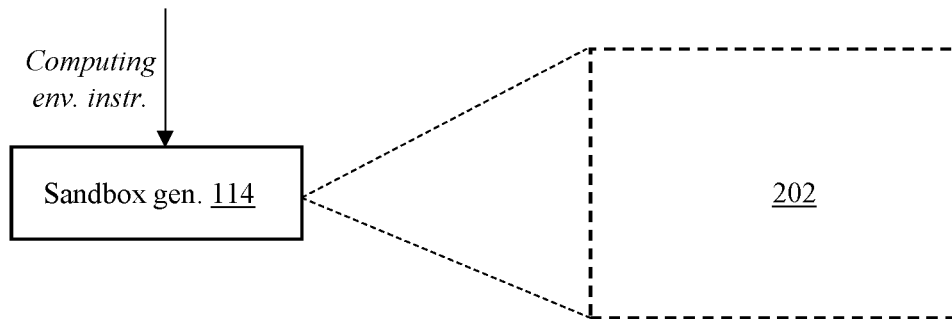
FIG. 2 illustrates the sandbox generation module of FIG. 1 receiving instructions and generating a computing environment in accordance with one embodiment.

Accordingly, FIG. 2 illustrates the sandbox generation module 114 of FIG. 1 creating a computing environment 202 in which the attack module 116 may execute one or more attack tools to simulate malicious activity. A user 106 may input instructions regarding how the sandbox generation module 114 should generate the computing environment. Additionally or alternatively, the sandbox generation module 114 may generate the computing environment based on received configuration data regarding a target network.

Figure 3:
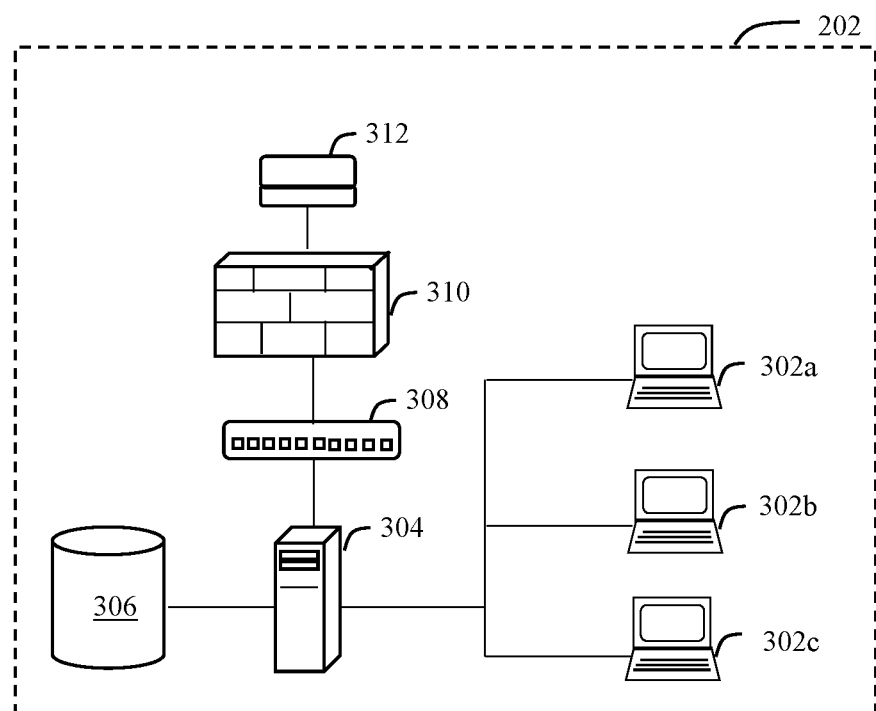
FIG. 3 illustrates the computing environment of FIG. 2 in accordance with one embodiment.

FIG. 3 illustrates the generated computing environment 202 of FIG. 2 in more detail. As seen in FIG. 3, the generated computing environment 202 may include one or more virtual hosts 302a-c, servers 304, storage(s) 306, virtual switches 308, firewalls 310, routers 312, traffic monitoring tools (not shown), etc. The exact configuration of the computing environment 202 may vary and may depend on the emulated target network.

Once the computing environment 202 is generated, data regarding the initial state (i.e., the "pre-attack" state) of the environment 202 may be captured and stored in one or more databases 130. This data may include addresses, hashes, read access permissions, write access permissions, or any other type of data relating to the configuration of the computing environment 202 and/or devices thereon.

Figure 4:
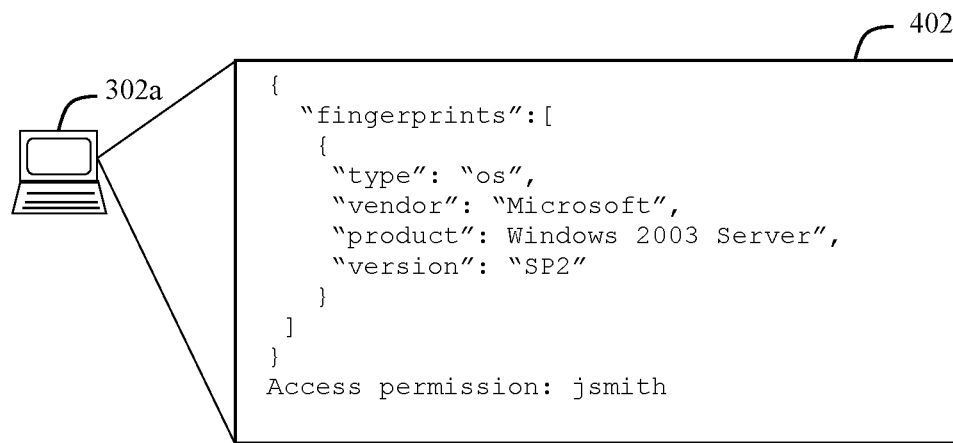
FIG. 4 illustrates exemplary fingerprint data corresponding to a virtual host device before an attack tool simulates malicious activity in accordance with one embodiment.

For example, FIG. 4 illustrates exemplary "fingerprint" data 402 regarding virtual device 302a of FIG. 3. This fingerprint data 402 may include, but is not limited to, products executing on the device 302a, product version, vendors, etc. The fingerprint data 402 may also include security-related data, such as who has access to the device 302a and their authorizations.

Figure 5:
FIG. 5 illustrates exemplary fingerprint data corresponding to a file before an attack tool simulates malicious activity in accordance with one embodiment.

As another example, FIG. 5 illustrates exemplary fingerprint data 502 for a file in the storage 306 of FIG. 3. For a given stored file, the fingerprint data 502 may include attributes such as file size, creation or last saved date, type, creator, users with read access permissions, users with write access permissions, etc. As seen in FIG. 5, the fingerprint data 502 for this particular file includes an MD5 hash. The above data is merely exemplary, and other types of data regarding files, processes, devices, security permissions, or any other type of data regarding network activity and/or configurations may be considered in conjunction with the systems and methods described herein.

Once the computing environment is configured, the attack module 116 may execute one or more attack tools to simulate malicious activity. It is noted that the terms "simulate malicious activity" or "simulated malicious activity" refers to activity that occurs in the computing environment and that, if occurring in an actual target network, would constitute malicious activity. In other words, the malicious activity that is "simulated" refers to activity that occurs in the generated computing environment.

Figure 6:
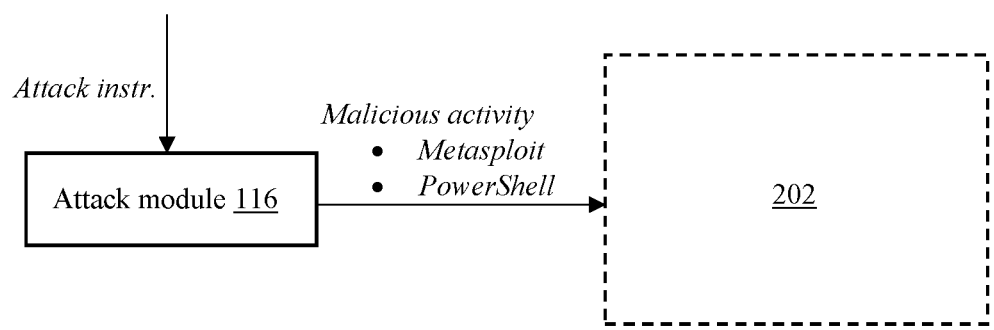
FIG. 6 illustrates the attack module of FIG. 1 receiving instructions and executing one or more attack tools to simulate malicious activity in accordance with one embodiment.

FIG. 6 illustrates the attack module 116 of FIG. 1 executing one or more attack tools in the computing environment 202 of FIG. 2. The attack module 116 may execute the attack tool(s) upon receiving instructions from a user 106 or autonomously once the computing environment is generated. The attack module 116 may execute tools including, but not limited to, Applicant's Metasploit® computer software, Powershell Empire, or any other exploit tools whether available now or invented hereafter.

Tools such as these inevitably change some aspect of the attacked system, network, device, etc. As discussed above, these changes generally qualify as detectable traces. The systems and methods herein therefore leverage these traces to determine that a network has been attacked or otherwise has been the victim of malicious activity.

Figure 7A:
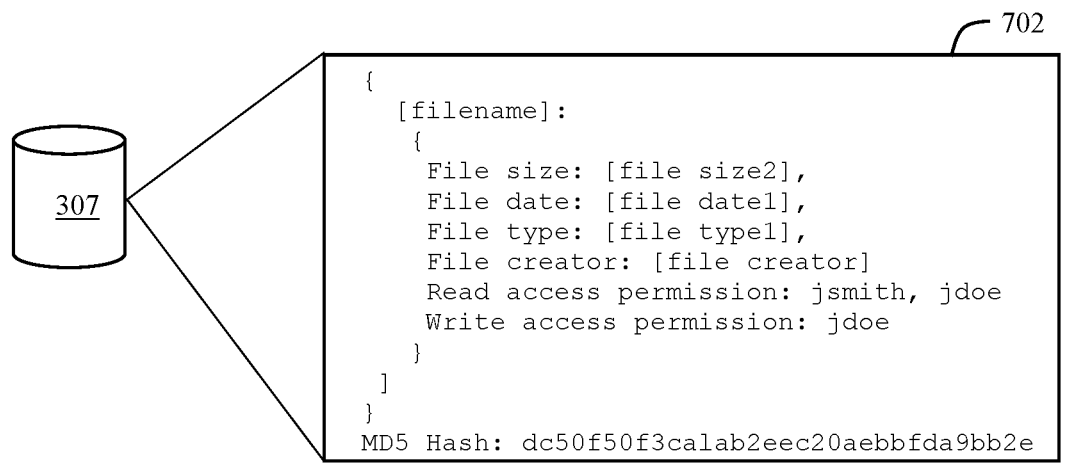
FIGS. 7A & B illustrate exemplary fingerprint data corresponding to the file of FIG. 5 after an attack tool simulates malicious activity in accordance with one embodiment.
Figure 7B:

FIGS. 7A & 7B, for example, illustrate exemplary fingerprint data 702 corresponding to the file of FIG. 5. Fingerprint data 702, however, presents the file attributes in a second state (i.e., during or after the attack module 116 executes the one or more attack tools). As seen in fingerprint data 702, some of the attributes have changed from the pre-attack state shown in FIG. 5. For example, FIG. 7B highlights that the file size, read access permission, write access permission, and MD5 hash have changed. These changes may therefore qualify as traces and be used to generate signatures.

It is noted that the data shown in FIGS. 4, 5, and 7A & B represent a high level abstraction and that the fingerprints and signatures may actually include much more detail and be presented differently. For example, the fingerprints and generated signatures may be generated in accordance with YARA® malware detection software or STIX™ malware detection software as would be understood by one of ordinary skill in the art.

Regardless of the exact configuration or detail of the fingerprints, there may be at least to different types of data considered. The first piece is essentially what is considered in the environment (e.g., a registry key, a file name, a process name, etc.). For example, the existence/creation of a file named %SYSTEMROOT%\system32\malware.exe or the creation/modification of a registry subkey under HKLM\Software\Microsoft\Windows\CurrentVersion\Run \ (discussed below) may constitute something on which a signature may be based. In operation, the systems and methods described herein may determine whether, e.g., a particular file exists, was modified, is on a running process list, etc.

The fingerprint may also include additional data about the process, file, etc., on which the signature is based. This additional data may include, for example, that a certain type of malware is present, the affected operating systems, or the like.

The traces shown in FIGS. 7A & 7B are only exemplary, and other traces may be detected and used to generate signatures as well. These may include, but are not limited to, at least one of a modified registry key, a modified file system access permission, a modified write access permission, a modified process, changed file paths, a modified file, and a dropped file.

Registry keys, for example, provide configuration information regarding Windows® operating systems. Registry keys are organized into hives or root keys that correspond to major different types of configurations or system components. For example, the hive HKEY_LOCAL_MACHINE (HKLM) stores configuration information regarding the local computer, hive HKEY_USERS (HKU) stores information about users on that system, and HKEY_CURRENT_USER (HKCU) is mapped to HKU and relates to the user who is currently logged into the system. Each hive includes several keys and sub-keys storing specific configuration data.

Although described as a configuration storage, the hives and their associated keys and sub-keys may change as a result of malicious activity. For example, if an exploit leverages a Windows system component vulnerability, the exploit may trigger a write to a value stored in the HKLM hive. If a specific user application is targeted, the exploit may change the values in that particular user's configuration information, potentially in hive HKU and hive HKCU.

The modification of a registry key is not necessarily the main goal of an attack or malicious activity. However, the modification of a registry key may be unavoidable based on the inherent function of an exploit or payload. Additionally, modifying a registry key may be necessary to help a malicious actor maintain persistent access to a host or to at least weaken a host in some way.

Another detectable trace may include any installed services or tasks that run at startup. For example, the embodiments described herein may inspect whether services or tasks run at startup that were not previously running. These may include key loggers, or other services that launch malicious activity upon startup.

Other detectable traces may include traces left in memory. These traces could be a block of malicious code, for example. As yet another example, detectable traces may include open network sockets or connections that were not previously open. These may indicate that someone or some program is attempting to initiate a communication link.

Referring back to FIG. 1, the signature generation module 118 may generate one or more signatures based on the detected traces. The generated signatures essentially represent a summary of traces expected due to certain malicious activity (e.g., a specific Metasploit attack pattern). If these signatures are detected in a target network, users 106 may therefore conclude that the target network has been the victim of malicious activity, such as the same type of attack pattern that led to the generated signature.

Upon the signature detection module 120 detecting one or more signatures present in activity on or otherwise associated with an actual, target network, the alert module 124 may issue one or more alerts. The alert(s) may be presented to a user 106 via the user interface 104 executing on the user device 102. The alert(s) may be visual-based, audio-based, text-based, haptic-based, or some combination thereof. The user 106 may then be inclined to investigate the activity further, as well as perform any mitigation or remedial measures. Additionally or alternatively, the virtual security appliance 108 may autonomously implement any mitigation or remedial measures.

Figure 8:
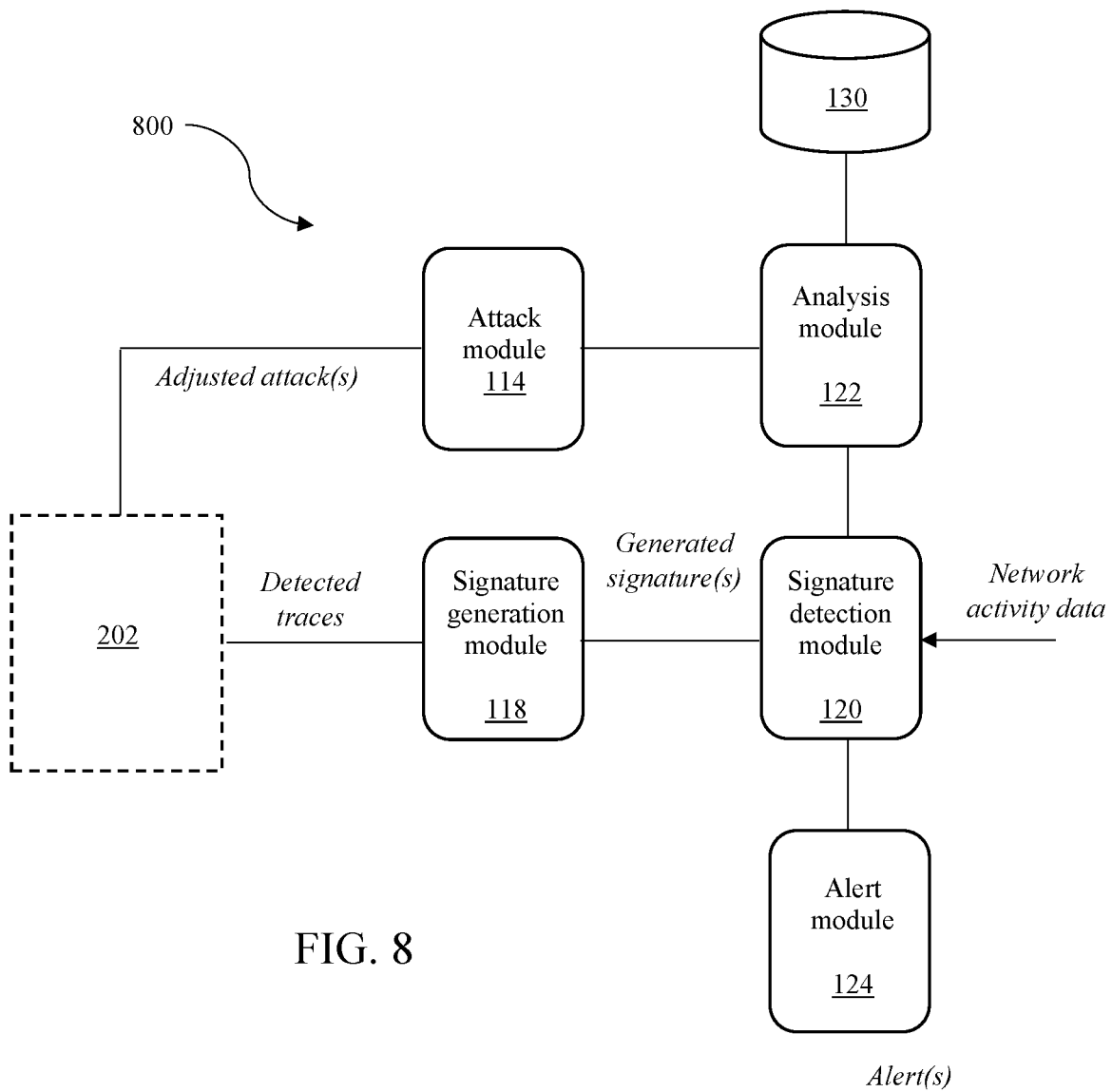
FIG. 8 depicts a workflow of the components of FIG. 1 in accordance with one embodiment.

FIG. 8 depicts a workflow 800 of the various components of the virtual security appliance 108 in accordance with one embodiment. Like components are designated with the same reference numerals as in previous figures unless otherwise noted.

The signature generation module 118 may receive data regarding detected traces in the computing environment 202 as a result of simulated malicious activity, and then generate signatures based on the detected traces. As discussed previously, the generated signature(s) essentially represent summaries of malicious activity that, if detected in a target network, may indicate that the target network has been the victim of malicious activity.

The signature generation module 118 may communicate the generated signature(s) to the signature detection module 120. The generated signature(s) may be stored in one or more databases 130 and be used to at least assist in monitoring activity occurring in a target network.

The signature detection module 120 may analyze activity logs associated with network activity to detect the presence of the generated signatures.

As discussed previously, the alert module 124 may then issue one or more alerts informing a user 106 that the signature detection module 120 has detected activity on a target network that matches a generated signature. The user 106 may therefore infer that the target environment has been the victim of malicious activity and, more specifically, been the victim of malicious activity that is at least similar to a specific attack pattern of the simulated malicious activity. The user 106 may then investigate further or perform any remedial or mitigation techniques. Additionally or alternatively, the virtual security appliance 108 may autonomously implement any appropriate remedial or mitigation techniques.

As seen in FIG. 8, the analysis module 122 may also receive and analyze data regarding the detected signatures from the signature detection module 120. The analysis module 122 may perform any appropriate analyses to either adjust parameters of the attack tool to generate more flexible and robust signatures, or to decrease the number of alerts.

Regarding the first feature, often times an adjustment to an attack tool can bypass a given signature. In other words, making minor adjustments to an attack tool may change the malicious activity and generated traces just enough so that it will not match a generated signature and therefore avoid detection.

Accordingly, the analysis module 122 may instruct the attack module 114 to adjust parameters of the executed attack tool(s) to generate more flexible and robust signatures. This approach therefore adjusts parameters of the attack tool(s) to obtain some variance in the generated signatures to detect a wider range of malicious activity.

The analysis module 122 may consult the database(s) 130 regarding previously detected traces and generated signatures. For example, the analysis module 122 may analyze previously executed attack tools and parameters thereof, as well as the detected traces and the resultant signatures. Additionally, the analysis module 122 may consider the actual activity in a target network matching the generated signatures. The database(s) 130 may store data in the form of a table such as Table 1:

TABLE 1

| Exemplary data for adjustment of attack tools | | | | |
|---|---|---|---|---|
| Attack Tool | Attack Tool Parameters | Traces | Generated Signatures | Matching Activity |

The analysis module 122 may analyze this type of data to predict, e.g., what type of activity will ultimately be detected in a target environment based on executed attack tools and parameters thereof. The analysis module 122 may then instruct the attack module 114 to vary one or more parameters of the attack tools to detect certain types of activity that would otherwise be undetected.

For example, the attack module 114 may adjust parameters of the attack tools such as, but not limited to, the level of obfuscation, connect-back address(es), persistence mode, SSL certificates for encrypted connections, connect-back ports or the like. With respect to connect-back ports, exploits may be configured to open a port to which an attacker can connect or on which an attacker can listen. Accordingly, these connect-back ports may be adjusted. As yet another example, the type of payload encoding may vary to evade intrusion detection systems (e.g., XOR encoding, Base64 encoding, etc.).

The computing environment may be reset after each simulation and then receive the new, adjusted attacks. This process may be iterated or otherwise repeated multiple times to develop a thorough dataset regarding attack tools, attack tool parameters, detected traces, generated signatures, and activity ultimately detected in a target environment that matches the generated signature(s).

Regarding the second feature, the analysis module 122 may also instruct the attack module 114 to adjust parameters of the attack tool(s) to decrease the number of alerts. In some cases, a generated signature may be too "greedy" in that it frequently matches with network activity data such that the number of generated alerts annoys or otherwise prohibitively burdens the user 106. These excessive alerts may be false positives, based on activity that is already known or been addressed, or based on data that is just noise.

In these instances, the analysis module 122 may analyze data such as the data of Table 1 above and instruct the attack module 114 to adjust one or more parameters of executed attack tools to prevent the signature generation module 118 from generating a signature that results in too many alerts. The attack module 114 may then automatically adjust the attack tools by varying parameters such as the level of obfuscation, connect-back address(es), persistence mode, or the like. Similarly, the signature generation module 118 may modify the scope of generated signatures as well. This ensures there are a number of meaningful alerts relating to malicious activity, but not too many alerts that would create alert fatigue for the user 106.

Figure 9:
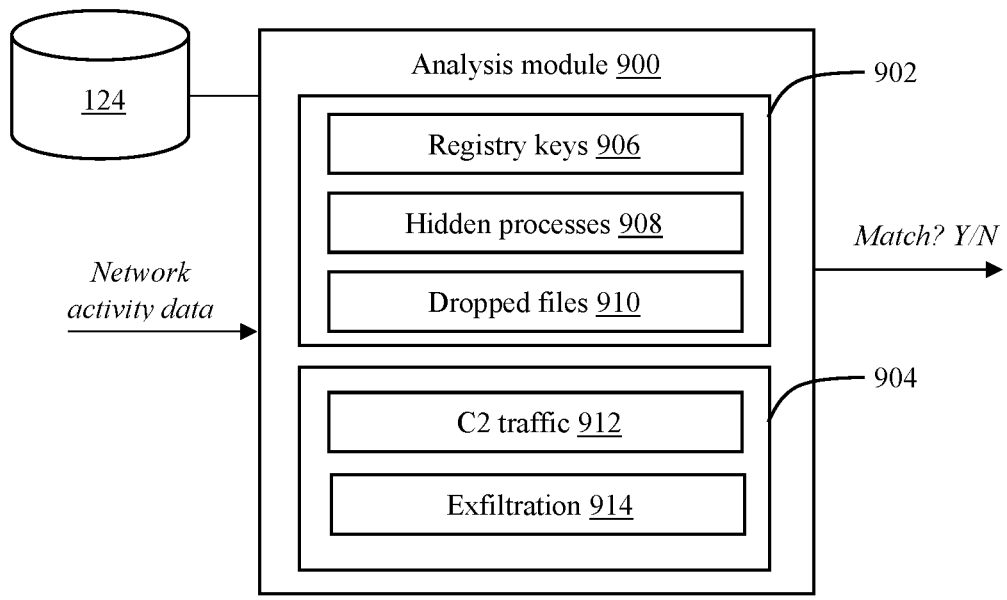
FIG. 9 illustrates an analysis module in accordance with one embodiment.

The previously-discussed embodiments are only examples, and other configurations or features may be implemented to accomplish the features of the methods and systems described herein. For example, FIG. 9 illustrates an analysis module 900 in accordance with one embodiment. The analysis module 900 may be similar to the analysis module 122 of FIG. 1.

The analysis module 900 of FIG. 9 may include a host-device submodule 902 and a network submodule 904. The host-device submodule 902 analyzes characteristics specific to a host device on a network, and the network submodule 904 analyzes more general data related to network traffic patterns. The submodules 902 and 904 may work in conjunction with each other so that the analysis module 900 can more accurately determine whether received traffic data qualifies as a match with a generated signature.

Specifically, the host-device submodule 902 may include a registry keys analyzer 906 to detect whether registry keys have been changed, a hidden process analyzer 908 to detect any hidden processes, and a dropped files analyzer 910 to detect whether any files have been dropped or otherwise deleted. The network submodule 904 may include a command-and-control (C2) analyzer 912 to detect whether a device is communicating with, for example, a remote server, and an exfiltration analyzer 914 to identify activity that is indicative of an exfiltration attempt.

The analysis module 900 may consider the output of the various submodules 902 and 904 and the individual components thereof to more accurately determine whether received traffic data matches a generated signature such that an alert should be issued. For example, if a given set of network activity data only includes a minor change to a registry key, the minor change may not be sufficient to constitute a match to warrant an alert. However, the likelihood of a given set of network activity data constituting a match with a generated signature may increase along with an increase in the number of particular characteristics present (such as those analyzed by the various components of FIG. 9). Accordingly, this ensures that only meaningful alerts are generated.

The analysis module 900 may analyze the output from one or more of the various components 906-914 in a variety of ways. For example, the analysis module 900 may output a decision that activity matches a signature if two or more of the components 906-14 provide a "vote" that their associated analysis indicates a match.

A user 106 may customize the sensitivity of the analysis module 900 depending on the application or their preferences. For example, some applications or users 106 may require that all five components 906-14 output a "match" vote before the analysis module 900 determines a match exists such that an alert should be generated. Other applications or users 106 may require only one of the components 906-14 to output a "match" vote before the analysis module 900 determines a match exists.

In some embodiments, a combination of different matches of components 906-14 may classify the behavior as malicious or normal activity. In this case, a logistic regression classifier could provide a more robust binary classification mechanism for whether malicious activity has occurred than a simple threshold of matches.

Figure 10:
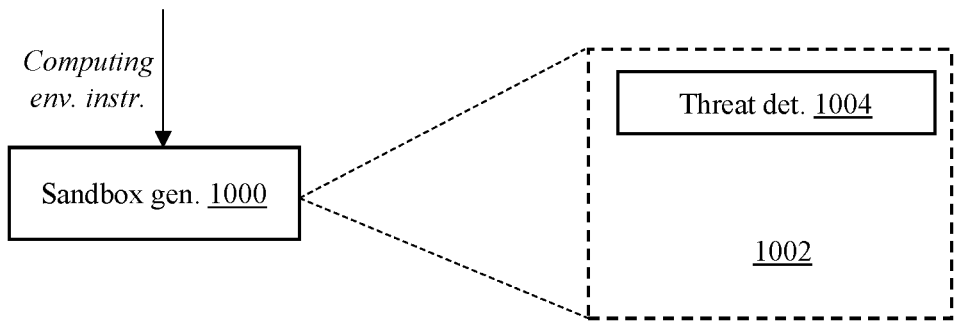
FIG. 10 illustrates a sandbox generation module generating a computing environment in accordance with another embodiment.

FIG. 10 illustrates a sandbox generation module 1000 generating a computing environment 1002 in accordance with another embodiment. The sandbox generation module 1000 and the computing environment 1002 may be similar to the sandbox generation module 114 and computing environment 202, respectively, of FIG. 2.

However, the computing environment 1002 may also include or otherwise execute one or more threat detection modules 1004. In addition to detecting traces regarding the simulation of malicious activity, it may be desirable to know how threat detection tools would react to the simulated malicious activity. For example, users 106 such as security personnel may want to know whether their frequently-used security tools would detect the malicious activity if the malicious activity actually occurred in a target network.

Accordingly, users 106 may embed threat detection tools in the computing environment 1002 to analyze how they behave. In the same way that the systems and methods described herein can generate signatures of malicious tools, they can also see which threat detection tools trigger alerts and which do not, as well as under what conditions. Users 106 may therefore be inclined to adjust various parameters of the attack tools to increase or decrease the number of alerts generated.

Figure 11:
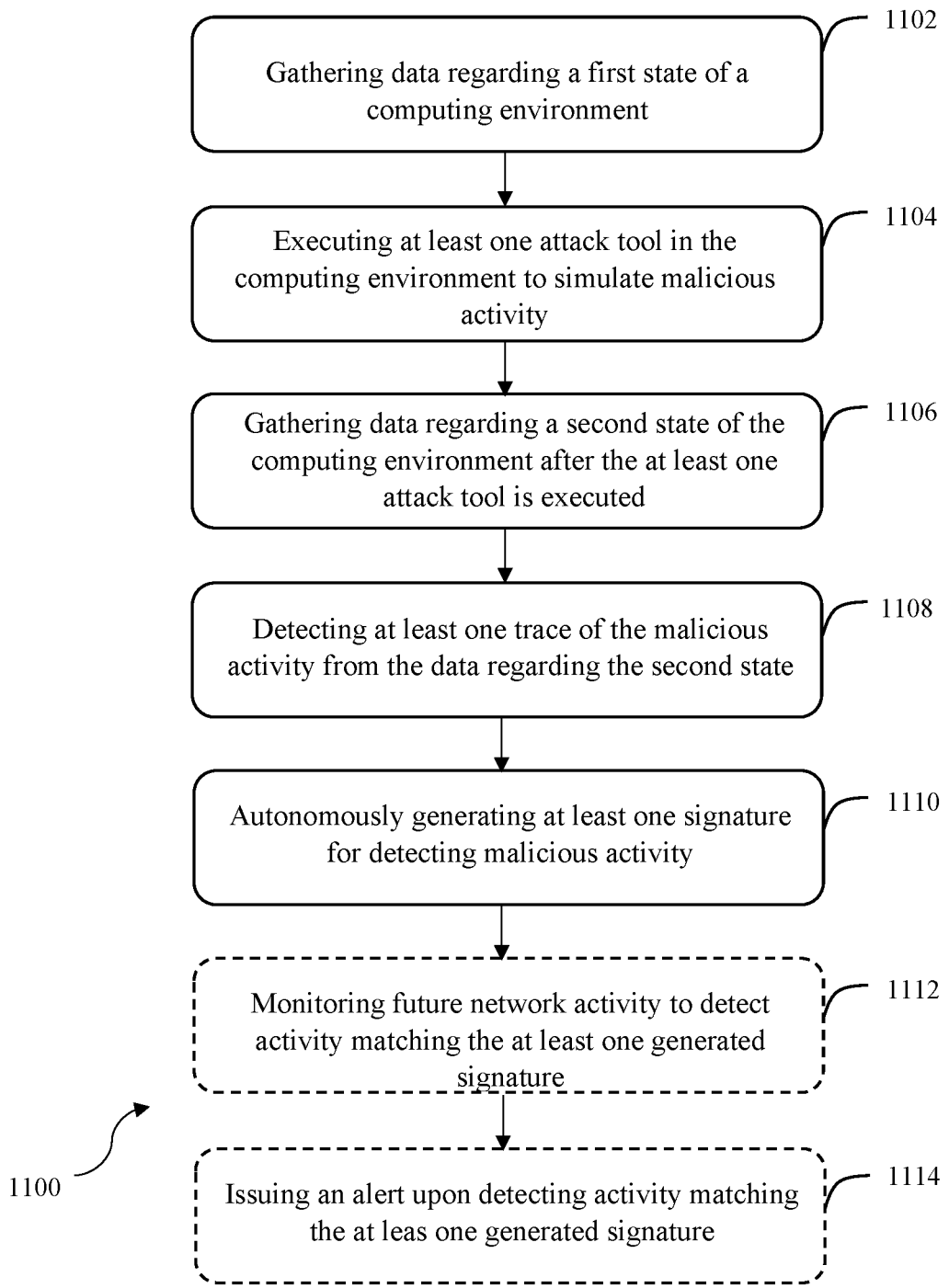
FIG. 11 depicts a flowchart of a method for detecting malicious activity on a network in accordance with one embodiment.

FIG. 11 depicts a flowchart of a method 1100 for detecting malicious activity on a network in accordance with one embodiment. Step 1102 involves gathering data regarding a first state of a computing environment. This computing environment may be a sandbox environment specifically configured to mimic a real, target environment. For example, the computing environment may be similar to the computing environment 202 of FIGS. 2 and 3. The computing environment may include any combination of various devices such as, but not limited to, virtual hosts, routers, servers, network monitoring tools, or the like.

Step 1104 involves executing at least one attack tool in the computing environment to simulate malicious activity. The attack tool(s) are meant to mimic or otherwise simulate malicious activity to determine how malicious activity will affect or otherwise change the computing environment or devices thereon. The attack tool(s) may include those discussed above, for example.

Step 1106 involves gathering data regarding a second state of the computing environment after the at least one attack tool is executed. This data may include the exemplary data shown in the fingerprint data of FIG. 4 or 5, for example. The type of data gathered from each device may depend on the type of device.

Step 1108 involves detecting at least one trace of the malicious activity from the data regarding the second state of the computing environment. As discussed previously, attack tools leave behind traces that may at least suggest malicious activity has taken place. These traces may relate to changes in file size, file save date, read access permissions, write access permissions, hashes, or any other type of data that may indicate that malicious activity has occurred in a computing environment.

Step 1110 involves autonomously generating at least one signature for detecting future malicious activity, wherein the at least one generated signature is based on the at least one detected trace. The generated signature(s) essentially represent a summary of the traces detected in the computing environment as a result of the simulated malicious activity.

Step 1112 involves monitoring future network activity to detect activity matching the at least one generated signature, wherein activity matching the at least one generated signature indicates malicious activity. Accordingly, the signatures generated in step 910 may be stored and later used to monitor activity on an actual, target network. Upon detecting activity on the target network matching the generated signature(s), it can be inferred that malicious activity has occurred on the target network. Specifically, it can be inferred that activity matching or at least similar to the simulated malicious activity has occurred on the network.

Step 1114 involves issuing an alert using a user interface upon detecting activity matching the at least one generated signature. A security analyst may investigate the activity or perform any appropriate mitigation steps or remedial measures. For example, the user 106 may isolate or otherwise halt communications to and from a device associated with the detected malicious activity. Additionally or alternatively, the systems and methods described herein may autonomously implement any appropriate mitigation or remedial measures.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Embodiments of the present disclosure, for example, are described above with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved. Additionally, or alternatively, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

A statement that a value exceeds (or is more than) a first threshold value is equivalent to a statement that the value meets or exceeds a second threshold value that is slightly greater than the first threshold value, e.g., the second threshold value being one value higher than the first threshold value in the resolution of a relevant system. A statement that a value is less than (or is within) a first threshold value is equivalent to a statement that the value is less than or equal to a second threshold value that is slightly lower than the first threshold value, e.g., the second threshold value being one value lower than the first threshold value in the resolution of the relevant system.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of various implementations or techniques of the present disclosure. Also, a number of steps may be undertaken before, during, or after the above elements are considered.

Having been provided with the description and illustration of the present application, one skilled in the art may envision variations, modifications, and alternate embodiments falling within the general inventive concept discussed in this application that do not depart from the scope of the following claims.

What is claimed is:

1. A method comprising:
   gathering data regarding a first state of a computing environment in a network;
   executing at least one attack tool in the computing environment to simulate malicious activity;
   gathering data regarding a second state of the computing environment after the at least one attack tool is executed;
   detecting at least one trace of the malicious activity from the data regarding the second state of the computing environment; and
   autonomously generating at least one signature for detecting future malicious activity in the network, wherein the at least one generated signature is based on the at least one detected trace and stored in a signature database along with the attack tool and one or more attack parameters used to generate the at least one signature.

2. The method of claim 1 wherein the computing environment is a sandbox environment.

3. The method of claim 1 wherein detecting the at least one trace comprises comparing the data regarding the second state of the computing environment to the data regarding the first state of the computing environment to detect at least one difference between the first state of the computing environment and the second state of the computing environment, the at least one difference being the at least one trace of the malicious activity.

4. The method of claim 1 further comprising monitoring future network activity to detect activity matching the at least one generated signature, wherein activity matching the at least one generated signature indicates malicious activity.

5. The method of claim 4 further comprising issuing an alert using a user interface upon detecting activity matching the at least one generated signature.

6. The method of claim 1 wherein the signature is associated with at least one signature parameter, and the method further includes receiving a recommendation to adjust at least one signature parameter to adjust the number of generated alerts regarding detected malicious activity.

7. The method of claim 1 wherein the attack tool is associated with at least one attack parameter, and the method further includes autonomously adjusting the at least one attack parameter to generate a variance in the at least one trace of malicious activity and in the at least one generated signature.

8. The method of claim 1 wherein the at least one trace includes at least one of a modified registry key, a modified file system access permission, a modified write access permission, a modified process, a modified file, and a dropped file.

9. The method of claim 1 further comprising validating the generated signature against a historical dataset of signatures to determine whether the generated signature is associated with an anomalous amount of malicious activity compared to the historical dataset.

10. A system comprising:
   at least one attack tool configured to simulate malicious activity in a network; and
   a virtual security appliance configured to execute instructions stored on memory to:
      gather data regarding a first state of a computing environment in the network before the attack tool simulates the malicious activity,
      gather data regarding a second state of the computing environment after the attack tool simulates the malicious activity,
      detect at least one trace of the malicious activity from the data regarding the second state of the computing environment, and
      autonomously generate at least one signature for detecting future malicious activity in the network, wherein the at least one generated signature is based on the at least one detected trace and stored in a signature database along with the attack tool and one or more attack parameters used to generate the at least one signature.

11. The system of claim 10 wherein the computing environment is a sandbox environment.

12. The system of claim 10 wherein the virtual security appliance detects the at least one trace by comparing the data regarding the second state of the computing environment to the data regarding the first state of the computing environment to detect at least one difference between the first state of the computing environment and the second state of the computing environment, the at least one difference being the at least one trace of the malicious activity.

13. The system of claim 10 wherein the virtual security appliance is further configured to monitor future network activity to detect activity matching the at least one generated signature, wherein activity matching the at least one generated signature indicates malicious activity.

14. The system of claim 13 further comprising a user interface configured to issue an alert upon the virtual security appliance matching the at least one generated signature.

15. The system of claim 10 wherein the signature is associated with at least one signature parameter, and the virtual security appliance is configured to receive a recommendation to adjust at least one signature parameter to adjust the number of generated alerts regarding detected malicious activity.

16. The system 10 wherein the attack tool is associated with at least one attack parameter, and the virtual security appliance is further configured to autonomously adjust the at least one attack parameter to generate a variance in the at least one trace of malicious activity and in the at least one generated signature.

17. The system of claim 10 wherein the at least one trace includes at least one of a modified registry key, a modified file system access permission, a modified write access permission, a modified process, a modified file, and a dropped file.

18. The system of claim 10 wherein the virtual security appliance is further configured to validate the generated signature against a historical dataset of signatures to determine whether the generated signature is associated with an anomalous amount of malicious activity compared to the historical dataset.

19. The system of claim 10 wherein the virtual security appliance is configured to update the signature database to record activities in the network that are matched by the generated signature.

20. The system of claim 10 wherein the virtual security appliance is configured to initiate a remedial or mitigation action in response to detection of a malicious activity in the network based on the generated signature.

* * * * *